US008718658B2

(12) United States Patent
Choi et al.

(10) Patent No.: US 8,718,658 B2
(45) Date of Patent: May 6, 2014

(54) COMMUNICATION SYSTEM FOR DISTRIBUTEDLY MANAGING INTERFERENCE USING FEEDBACK MESSAGE

(75) Inventors: Hyun Ho Choi, Suwon-si (KR); Hyo Sun Hwang, Seoul (KR); Jong Bu Lim, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 12/715,436

(22) Filed: Mar. 2, 2010

(65) Prior Publication Data

US 2010/0330917 A1    Dec. 30, 2010

(30) Foreign Application Priority Data

Jun. 25, 2009  (KR) .................. 10-2009-0056917

(51) Int. Cl.
*H04W 72/00* (2009.01)

(52) U.S. Cl.
USPC ............ 455/450; 455/63.1; 455/69; 455/522; 455/442; 455/127.1; 455/452; 455/422.1; 455/454; 455/67.11; 455/67.13; 370/331; 370/337; 370/328; 370/330; 370/343

(58) Field of Classification Search
USPC .......... 455/63.1, 522, 127.1, 452, 422.1, 454, 455/67.11, 436, 67.13, 226.2, 226.3, 69, 455/450, 442; 370/331, 337, 328, 329, 330, 370/229, 343, 336
See application file for complete search history.

(56) References Cited

U.S. PATENT DOCUMENTS

| 5,982,760 | A  | * | 11/1999 | Chen ............................ | 370/335 |
| 6,545,994 | B2 | * | 4/2003  | Nelson et al. ................ | 370/337 |
| 6,798,761 | B2 | * | 9/2004  | Cain et al. .................... | 370/337 |
| 7,146,171 | B2 | * | 12/2006 | Tang et al. .................... | 455/450 |
| 7,424,297 | B2 | * | 9/2008  | Park et al. .................... | 455/442 |

(Continued)

FOREIGN PATENT DOCUMENTS

| JP | 2006-135673   | 5/2006 |
| JP | 2008-61250 A  | 3/2008 |

(Continued)

OTHER PUBLICATIONS

Japanese Office Action mailed Jan. 21, 2014 in counterpart Japanese Application No. 2012-517365 (6 pages, in Japanese, with English translation).

*Primary Examiner* — Matthew D. Anderson
*Assistant Examiner* — Ganiyu A Hanidu
(74) *Attorney, Agent, or Firm* — NSIP Law (57) ABSTRACT

A method of operating a target terminal being serviced by a serving base station is provided. In a downlink case, the target terminal being served by the serving base station may provide a feedback message to a neighboring base station. The feedback message may be used by the neighboring base station to verify channel information between the serving base station and the target terminal, and channel information between the neighboring base station and the target terminal. In an uplink case, the neighboring base station may provide the feedback message to the target terminal. The target terminal may transfer, to the serving base station, channel information between the neighboring base station and a particular terminal, and channel information between the neighboring base station and the target terminal that are verified based on the feedback message. The feedback message may be transferred using a common shared channel or a random access channel.

12 Claims, 9 Drawing Sheets

(56) References Cited

U.S. PATENT DOCUMENTS

| | | | |
|---|---|---|---|
| 2002/0041566 A1* | 4/2002 | Yang et al. | 370/229 |
| 2002/0045451 A1* | 4/2002 | Hwang et al. | 455/442 |
| 2003/0078051 A1* | 4/2003 | Fattouch | 455/452 |
| 2004/0110477 A1* | 6/2004 | Nishimura et al. | 455/127.1 |
| 2004/0224677 A1* | 11/2004 | Kuchibhotla et al. | 455/422.1 |
| 2006/0165032 A1 | 7/2006 | Hamalainen et al. | |
| 2007/0002799 A1* | 1/2007 | Hunzinger | 370/331 |
| 2008/0026782 A1* | 1/2008 | Kwon et al. | 455/522 |
| 2009/0042596 A1 | 2/2009 | Yavuz et al. | |
| 2009/0202014 A1* | 8/2009 | Mujtaba et al. | 375/267 |
| 2010/0322185 A1* | 12/2010 | Park et al. | 370/331 |

FOREIGN PATENT DOCUMENTS

| | | |
|---|---|---|
| JP | 2008-252253 | 10/2008 |
| KR | 1020080026692 | 3/2008 |
| KR | 1020090006200 | 1/2009 |
| WO | WO 2008/087169 A2 | 7/2008 |
| WO | WO 2008/087169 A3 | 7/2008 |
| WO | WO 2008/090154 | 7/2008 |
| WO | WO 2008/156417 A2 | 12/2008 |
| WO | WO 2009/041040 A1 | 4/2009 |

* cited by examiner

FIG. 1

DOWNLINK CASE

FIG. 2

UPLINK CASE

FIG. 3

DOWNLINK CASE

UPLINK CASE

COMMUNICATION SYSTEM FOR DISTRIBUTEDLY MANAGING INTERFERENCE USING FEEDBACK MESSAGE

CROSS-REFERENCE TO RELATED APPLICATION

This application claims the benefit under 35 U.S.C. §119 (a) of a Korean Patent Application No. 10-2009-0056917, filed on Jun. 25, 2009, in the Korean Intellectual Property Office, the entire disclosure of which is incorporated herein by reference for all purposes.

BACKGROUND

1. Field

The following description relates to technologies for managing interference, and more particularly, to technologies that may reduce or overcome adverse effects resulting from interference occurring between two cells, where at least two cells such as a femtocell and a macro cell are adjacent to each other.

2. Description of Related Art

The rapid development of multi-cell communication systems has provided a need for more accurate and efficient communication methods. The multi-cell communication system may include at least two macro cells, and may include a macro cell and a small-sized cell, for example, a femto base station, a pico base station, and the like.

For example, the small-sized cell may be a communication system that includes the macro cell and a femtocell including the femto base station. Generally, terminals included in a coverage area of the femtocell may be served by the femto base station which is positioned in an adjacent location, and thus it is possible to achieve a high transmission rate. Where the macro cell includes at least a portion of the femtocell, interference may occur between the macro cell and the femtocell. The interference may cause adverse effects against both the macro cell and the femtocell.

Overcoming these adverse effects resulting from the interference between the macro cell and the femtocell gives rise to complicated issues. Accordingly, technologies associated with an interference control are in development to overcome the above adverse effects. The technologies associated with the interference control may be embodied into various types, for example, an optimal resource scheduling, a transmit power control such as a dynamic spectrum management, an interference alignment, an interference treated as noise (ITN), an interference neutralization, a multi-antenna transmit, and the like.

The macro cell and the femtocell may need to appropriately share channel information to perform an interference control. However, where the macro cell and the femtocell appropriately share channel information, other adverse effects may result, for example, an increase in overhead of a communication system, and the like.

SUMMARY

In one general aspect, there is provided a method of operating a target terminal being serviced by a serving base station, including generating a feedback message that is used by a neighboring base station to verify channel information between the serving base station and the target terminal, and channel information between the neighboring base station and the target terminal, and providing the feedback message to the neighboring base station.

The providing of the feedback message may include providing the feedback message using a common shared channel or a random access channel.

The generating of the feedback message may include generating the feedback message by combining a well-known signal and the channel information between the serving base station and the target terminal.

The generating of the feedback message may include generating the feedback message by processing the channel information between the serving base station and the target terminal to a reference signal.

The method may further include periodically or aperiodically generating the channel information between the serving base station and the target terminal.

The method may further include recognizing interference caused by the neighboring base station wherein the generating of the feedback message may include generating the feedback message according to the recognized interference, or the providing of the feedback message may include providing the feedback message according to the recognized interference.

The recognizing may include recognizing the interference caused by the neighboring base station, based on at least one of a signal-to-interference plus noise ratio (SINR) with respect to a signal received from the serving base station, a packet error rate, and a bit error rate.

The recognizing may include recognizing the interference caused by the neighboring base station, based on a comparison result between a particular level and the interference caused by the neighboring base station.

The serving base station, the target terminal, and the neighboring base station may operate according to a time division duplex (TDD) scheme, and the channel information between the neighboring base station and the target terminal may be regarded as the same in each of an uplink and a downlink.

The feedback message may be used by the neighboring base station to perform an interference control.

In another general aspect, there is provided a method of operating a neighboring base station that is adjacent to a serving base station serving a target terminal, and serves a particular terminal, including generating a feedback message that is generated by the target terminal to verify channel information between the neighboring base station and the particular terminal, and channel information between the neighboring base station an the target terminal, and providing the feedback message to the target terminal, wherein the target terminal may transfer to the serving base station, the channel information between the neighboring base station and the particular terminal, and the channel information between the neighboring base station and the target terminal that are verified based on the feedback message.

The providing of the feedback message may include providing the feedback message using a common shared channel or a random access channel.

The providing of the feedback message may include generating the feedback message by combining a well-known signal and the channel information between the neighboring base station and the particular terminal, or may include generating the feedback message by processing the channel information between the neighboring base station and the particular terminal to a reference signal.

The method may further include periodically or aperiodically generating the channel information between the neighboring base station and the particular terminal.

The method may further include recognizing interference caused by the target terminal, wherein the generating of the feedback message may include generating the feedback message according to the recognized interference, or the providing of the feedback message may include providing the feedback message according to the recognized interference.

The recognizing may include recognizing interference caused by the neighboring base station, based on at least one of an SINR with respect to a signal transmitted from the neighboring base station to the particular terminal, a packet error rate, and a bit error rate, or may include recognizing the interference caused by the target terminal, based on a comparison result between a particular level and the interference caused by the target terminal.

The serving base station may perform an interference control based on the channel information between the neighboring base station and the particular terminal, and the channel information between the neighboring base station and the target terminal.

In another general aspect, there is provided a computer-readable storage medium storing a program to operate a target terminal being serviced by a serving base station comprising instructions to cause a computer to generate a feedback message that is used by a neighboring base station to verify channel information between the serving base station and the target terminal, and channel information between the neighboring base station and the target terminal, and provide the feedback message to the neighboring base station.

In another general aspect, there is provided a target terminal being serviced by a serving base station including a channel measurement unit to periodically or aperiodically generate channel information between the serving base station and the target terminal, a message generator to generate a feedback message that is used by a neighboring base station to verify channel information between the serving base station and the target terminal, and channel information between the neighboring base station and the target terminal, and a message provider to provide the feedback message to the neighboring base station.

The target terminal may further include an interference recognition unit to recognize interference caused by the neighboring base station, wherein the message generator may generate the feedback message according to the recognized interference, or the message provider may provide the feedback message according to the recognized interference.

The message generator may generate the feedback message by combining a well-known signal and the channel information between the serving base station and the target terminal, or may generate the feedback message by processing the channel information between the serving base station and the target terminal to a reference signal and the message provider may provide the feedback message using a common shared channel or a random access channel.

Other features and aspects will become apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will be suggested to those of ordinary skill in the art. Descriptions of well-known functions and constructions may be omitted for increased clarity and conciseness.

The term "base station" used herein may include a general base station of a cellular base station and various types of devices, but is not limited thereto. The "base station" may include devices used to serve various types of receivers such as terminals. The term "terminal" used herein may include a mobile device, for example, a cellular phone, a notebook, a smart phone, etc., and may also include various types of devices to receive a data signal from the base station or a relay, but is not limited thereto.

The term "femto base station" used herein may be an example of a small base station and thus embodiments may be well applicable to other small base stations as well as the femto base station.

Figure 1:
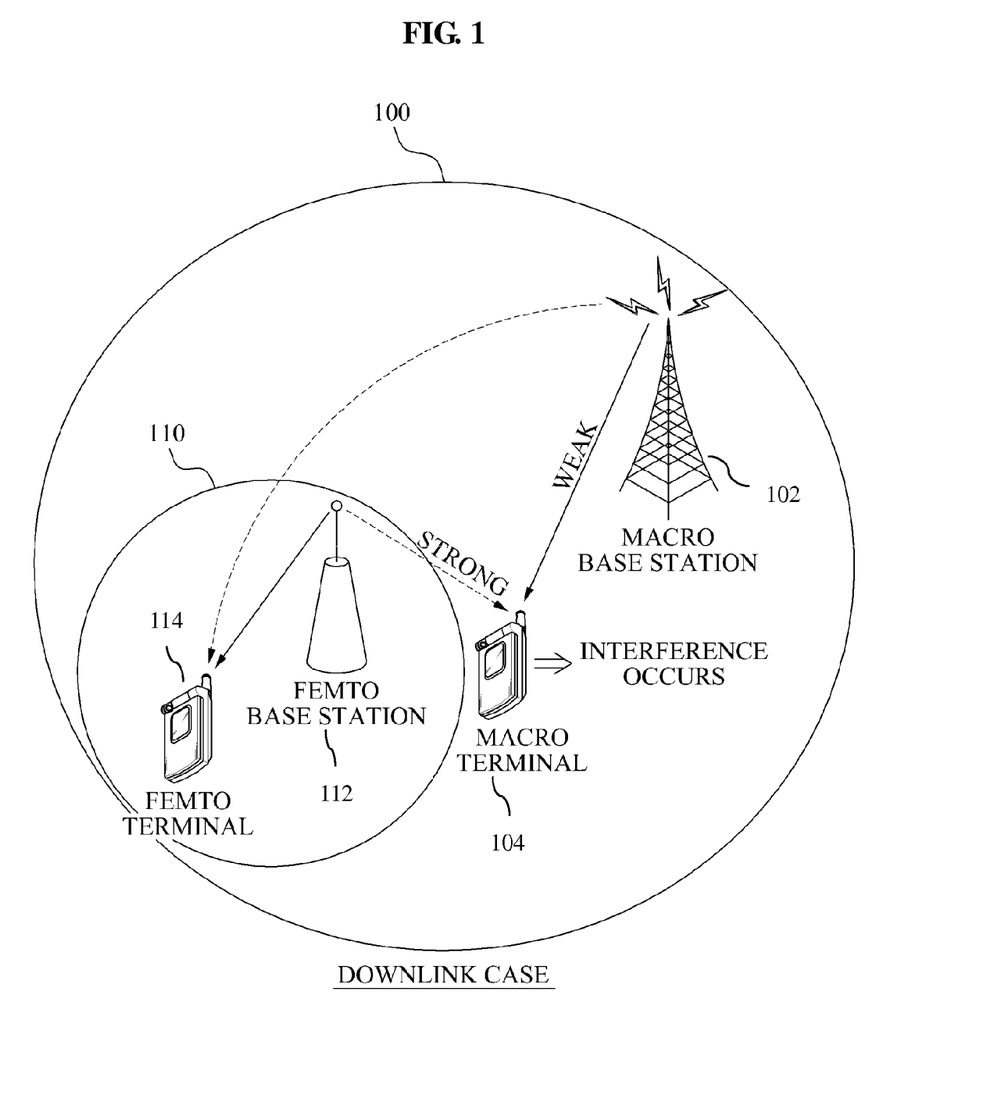
FIG. 1 is a diagram illustrating interference occurring in an example of a macro terminal due to a femto base station in a downlink case.

FIG. 1 illustrates interference occurring in an example of a macro terminal due to a femto base station in a downlink case.

Referring to FIG. 1, a coverage 100 of a macro cell includes a coverage 110 of a femtocell. The macro cell is operated by a macro base station 102 and the femtocell is operated by a femto base station 112.

As illustrated in FIG. 1, in the downlink case, the macro base station 102 may transmit a signal to a macro terminal 104, and the femto base station 112 may transmit a signal to a femto terminal 114. The macro terminal 104 denotes a terminal that is served by the macro terminal 104. The femto terminal denotes a terminal that is served by the femto base station 112. Each of the macro base station 102 and the femto base station 112 may transmit a corresponding signal using a same radio resource.

Where the macro base station 102 and the femto base station 112 use the same radio resource, interference may occur between the macro cell and the femtocell. In particular, as illustrated in FIG. 1, where the macro terminal 104 is adjacent to the coverage 110 of the femtocell, the femto base station 112 may cause a great amount of interference in the macro terminal 104.

In FIG. 1, a solid line extending from the macro base station 102 to the macro terminal 104 indicates a desired transmitted signal, and a dotted line extending from the femto base station 112 to the macro terminal 104 indicates an undesired interference signal. Where a strength of the interference signal from the femto base station 112 is great, the macro terminal 104 may not appropriately receive the desired signal from the macro base station 102.

Figure 2:
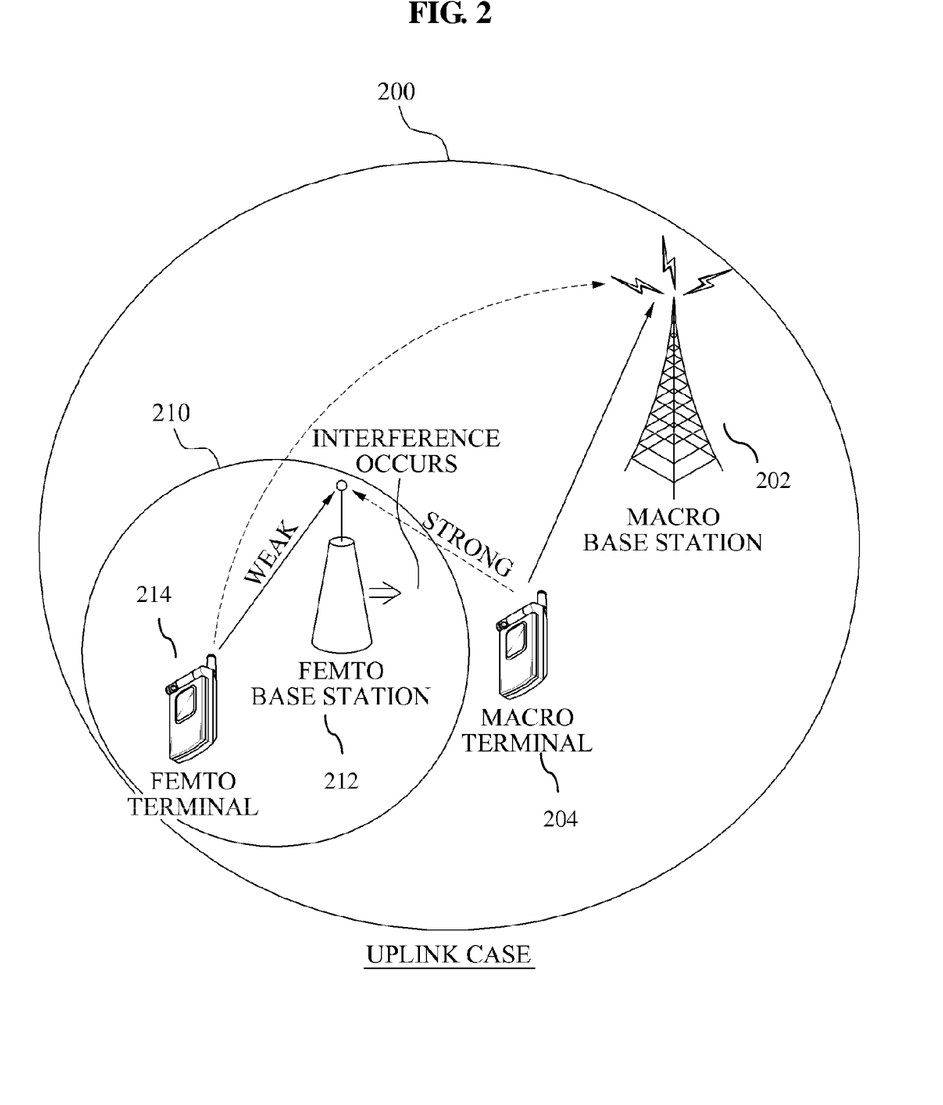
FIG. 2 is a diagram illustrating interference occurring in an example of a femto base station due to a macro terminal in an uplink case.

FIG. 2 illustrates interference occurring in an example of a femto base station due to a macro terminal in an uplink case.

Referring to FIG. 2, a coverage 200 of a macro cell includes a coverage 210 of a femtocell.

As illustrated in FIG. 2, in the uplink case, a macro terminal 204 may transmit a corresponding signal to a macro base station 202, and a femto terminal 214 may transmit a corresponding signal to the femto base station 204. Where the macro terminal 204 and the femto terminal 214 use a same radio resource, interference may occur in the femto base station 212 as a result of interference from the macro terminal 204. In particular, as illustrated in FIG. 2, where the macro terminal 204 is adjacent to the coverage 210 of the femtocell, the macro terminal 204 may cause a great amount of interference in the femto base station 212.

In FIG. 2, a solid line extending from the femto terminal 214 to the femto base station 212 indicates a desired transmitted signal, and a dotted line extending from the macro terminal 204 to the femto base station 212 indicates an undesired interference signal. Where a strength of the interference signal from the macro terminal 204 is great, the femto base station 212 may not appropriately receive the desired signal from the femto terminal 214.

As illustrated in FIGS. 1 and 2, where interference occurs in a macro terminal or a femto base station, the femto base station or the macro base station may perform an interference control. For example, the femto base station or the macro base station may perform the interference control such as an optimal resource scheduling, a transmit power control such as a dynamic spectrum management, an interference alignment, an interference treated as noise (ITN), interference neutralization, a multi-antenna transmit, etc., but is not limited thereto.

Referring to FIGS. 1 and 2, since the femtocell and the macro cell are independent from each other as different cells, it may be difficult to directly control interference between various terminals and base stations in the femtocell and the macrocell. For example, where the interference occurs in the macro terminal 104 due to a signal emitted from the femto base station 112 in the downlink case, as illustrated in FIG. 1, the macro base station 102 may not directly control the femto base station 112. The femto base station 112 may need to verify information regarding various channels in association with the macro terminal 104 to perform the interference control.

However, verification of the above channel information may cause great overheads.

Figure 3:
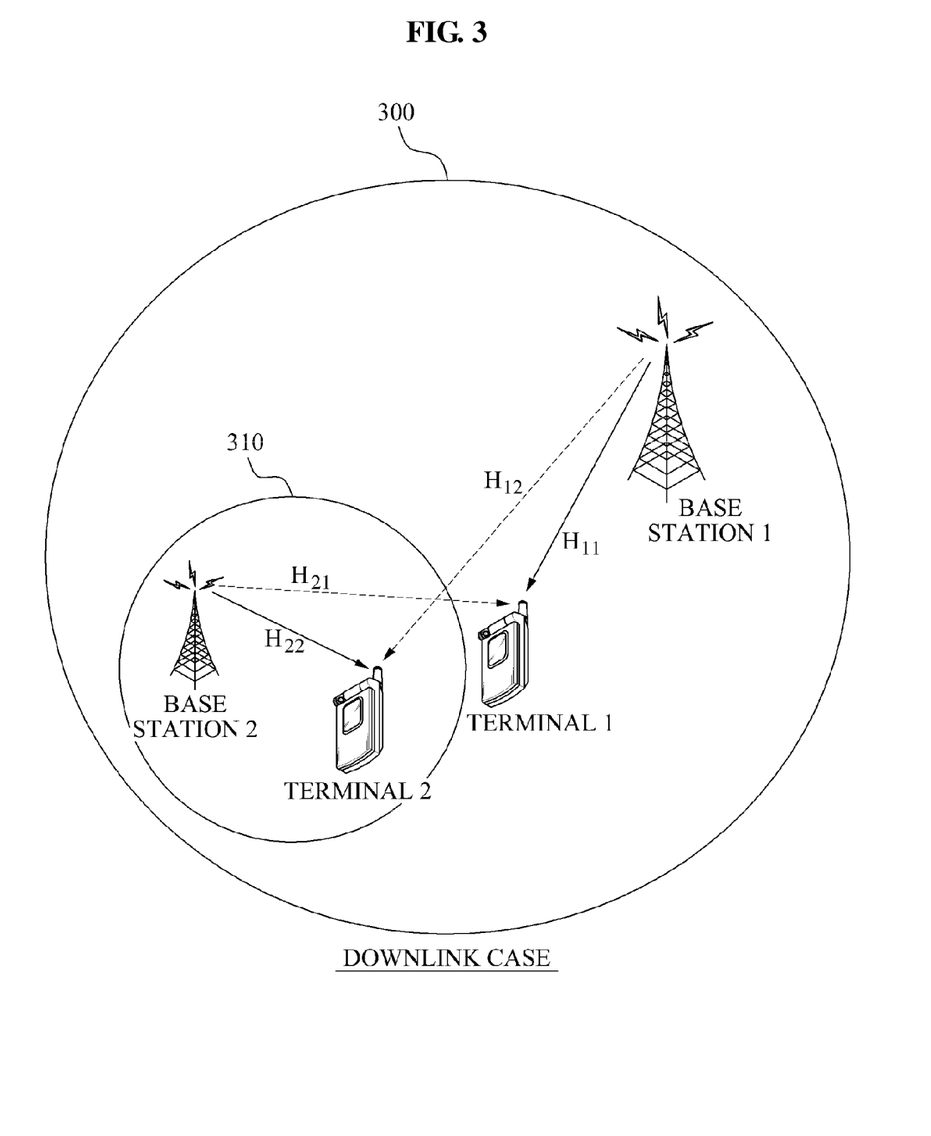
FIG. 3 is a diagram illustrating examples of channels between base stations and terminals in a downlink case.

FIG. 3 illustrates examples of channels between base stations and terminals in a downlink case.

Referring to FIG. 3, it is assumed that a channel between a base station 1 and a terminal 1 is $H_{11}$, a channel between the base station 1 and a terminal 2 is $H_{12}$, a channel between a base station 2 and the terminal 1 is $H_{21}$, and a channel between the base station 2 and the terminal 2 is $H_{22}$. In association with the terminal 1, the channel $H_{11}$ indicates a channel corresponding to a desired signal, and the channel $H_{21}$ indicates an inference channel corresponding to an interference signal.

To outperform adverse effects resulting from interference occurring in the terminal 1, the base station 2 may perform the interference control such as a dynamic spectrum management. Accordingly, the base station 2 may need to verify the channels $H_{11}$ and $H_{21}$.

A process where the base station 2 verifies the channels $H_{11}$ and $H_{21}$ will be described in detail with reference to FIG. 4.

Figure 4:
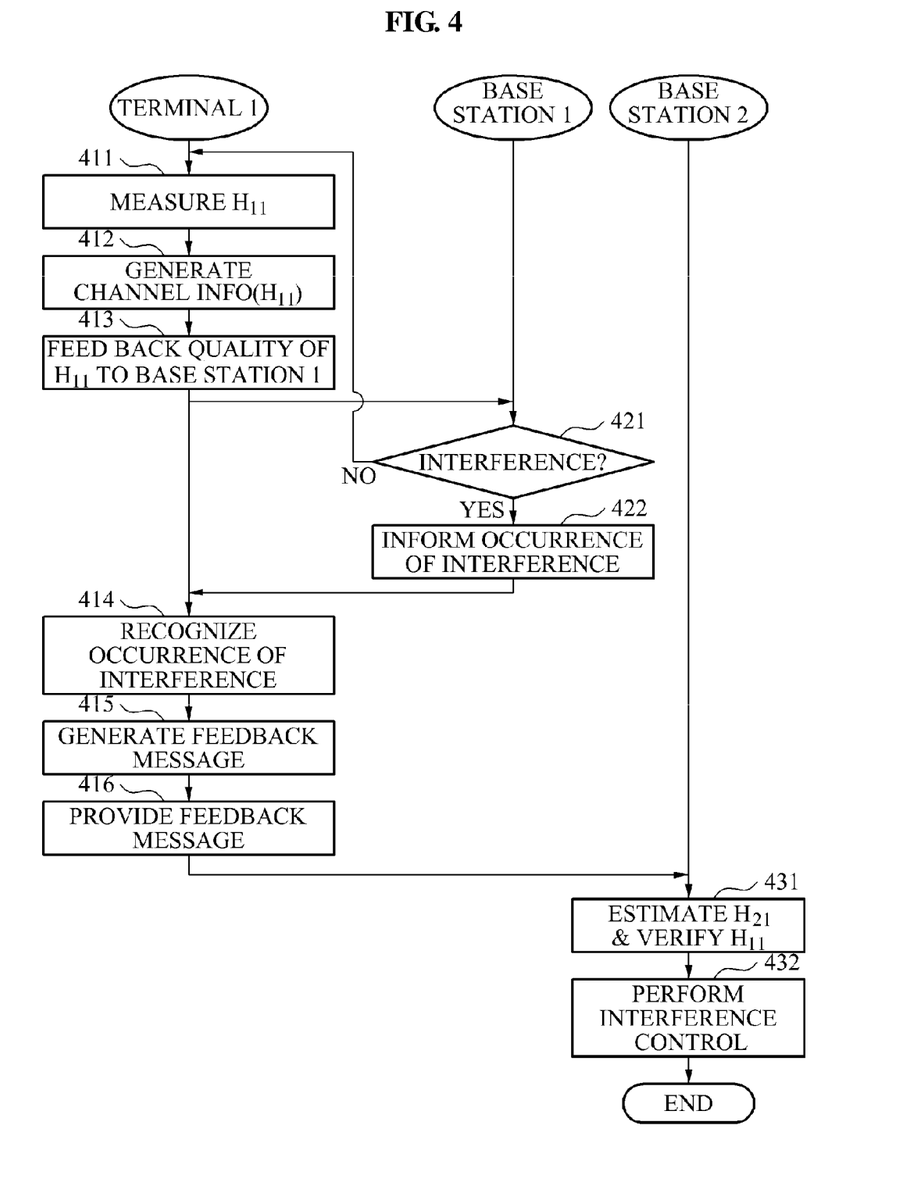
FIG. 4 is a flowchart illustrating an example of a method of operating a terminal 1, a base station 1 and a base station 2 of FIG. 3.

FIG. 4 illustrates an example of a method of operating the terminal 1, the base station 1 and the base station 2 of FIG. 3.

At 411, the terminal 1 measures the channel $H_{11}$ between the base station 1 and the terminal 1. For example, the terminal 1 may periodically or aperiodically measure the channel $H_{11}$ using a pilot signal transmitted from the base station 1.

At 412, the terminal 1 generates channel information associated with the channel $H_{11}$, based on the measured channel $H_{11}$ between the base station 1 and the terminal 1. The channel information associated with the channel $H_{11}$ may include channel quality information, for example, a signal-to-interference plus noise ratio (SINR) with respect to the channel $H_{11}$.

At 413, the terminal 1 feeds back channel information of the channel $H_{11}$ to the base station 1. The terminal 1 may feed back the channel information of the channel $H_{11}$ to the base station 1 using a well-known channel quality information (CQI) feedback scheme.

At 421, the base station 1 determines whether interference exists in the terminal 1 based on the channel information of the channel $H_{11}$. The terminal 1 may also determine whether an interference exists which is different from FIG. 4.

The base station 1 may determine whether the interference exists in the terminal 1, based on an SINR of the terminal 1, a packet error rate (PER), a bit error rate (BER), and the like. In particular, the base station 1 may determine whether the interference exists by comparing the SINR, the PER, the BER, and the like with a particular level. For example, where the SINR at the terminal 1 becomes smaller than the particular level, or where the PER or the BER becomes greater than the particular level, the base station 1 may determine the interference exists in the terminal 1.

Where it is determined the interference does not exist in the terminal 1, the terminal 1 may repeat 411 through 413. In contrast, where it is determined the interference exists in the terminal 1, the base station 1 informs the terminal 1 that the interference occurred in the terminal 1 at 422.

At 414, the terminal 1 recognizes the occurrence of the interference in response to the notice from the base station 1.

At 415, where the terminal 1 recognizes the occurrence of the interference, the terminal 1 generates a feedback message. Accordingly, the feedback message may be used to inform the base station 2 about channel information associated with the channel $H_{11}$ between the base station 1 and the terminal 1, and channel information associated with the channel $H_{21}$ between the base station 2 and the terminal 1.

Furthermore, the base station 2 may verify, using only the feedback message, channel information associated with the channel $H_{11}$ between the base station 1 and the terminal 1, and channel information associated with the channel $H_{21}$ between the base station 2 and the terminal 1, which will be described in detail with reference to FIGS. 7 and 8. The feedback message may be generated various types of schemes as follows.

Referring to FIGS. 3 and 4, the terminal 1 may generate the feedback message by combining a well-known signal, such as a preamble or a pilot signal, and channel information associated with the channel $H_{11}$ between the base station 1 and the terminal 1. Accordingly, the base station may need to verify channel information associated with the channel $H_{11}$ between the base station 1 and the terminal 1 that is included in the feedback message. Also, while receiving the feedback message, the base station 2 may estimate channel information associated with the channel $H_{21}$ between the base station 2 and the terminal 1 using the well-known signal such as the preamble or the pilot signal, included in the feedback message. Specifically, the base station 2 may estimate channel information associated with a channel from the base station 2 to the terminal 1, and may also estimate channel information associated with a channel from the terminal 1 to the base station 2, using the feedback message. In a time division duplex (TDD) system, the channel from the base station 2 to the terminal 1 may be considered to be the same as the channel from the terminal 1 to the base station 2. Accordingly, the base station 2 may estimate channel information associated with the channel from the terminal 1 to the base station 2, instead of estimating the channel information associated with the channel from the terminal 1 to the base station 2.

Second, the terminal 1 may generate the feedback message by processing channel information associated with the channel $H_{11}$ between the base station 1 and the terminal 1. In particular, the terminal 1 may process channel information associated with the channel $H_{11}$ between the base station 1 and the terminal 1 to a reference signal.

For example, the terminal 1 may process channel information associated with the channel $H_{11}$ between the base station 1 and the terminal 1 to an orthogonal reference signal such as a constant amplitude zero autocorrelation (CAZAC) sequence, based on an SINR of the channel $H_{11}$ between the base station 1 and the terminal 1, and a cell ID of the base station 1. Specifically, channel information associated with the channel $H_{11}$ between the base station 1 and the terminal 1 may map the orthogonal reference signal, based on a range of the SINR of the channel $H_{11}$ between the base station 1 and the terminal 1. In this case, the base station 2 may verify a pattern of received orthogonal reference signals to thereby verify channel information associated with the channel $H_{11}$ between the base station 1 and the terminal 1. Also, the base station 2 may estimate channel information associated with the channel $H_{21}$ between the base station 2 and the terminal 1.

Two schemes of generating, by the terminal 1, the feedback message are described above. In addition to the aforementioned schemes, the terminal 1 may generate the feedback message using various types of schemes, so that the base station 2 may simultaneously verify channel information associated with the channel $H_{11}$ between the base station 1 and the terminal 1, and channel information associated with the channel $H_{21}$ between the base station 2 and the terminal 1.

At 416, the terminal 1 provides the generated feedback message to the base station 2. Accordingly, the terminal 1 may use a common shared channel or a random access channel. In particular, where the terminal 1 uses the random access channel, the terminal 1 may process the feedback message to an orthogonal reference signal in preparation for a collision. That the terminal 1 uses the common shared channel and the random access channel will be described later with reference to FIGS. 7 and 8.

At 431, the base station 2 simultaneously estimates channel information associated with the channel $H_{21}$ between the base station 2 and the terminal 1 based on the feedback message provided from the terminal 1, and verifies channel information associated with the channel $H_{11}$ between the base station 1 and the terminal 1.

At 432, the base station 2 performs an interference control using various types of schemes, for example, a dynamic spectrum management, based on channel information associated with the channel $H_{11}$ between the base station 1 and the terminal 1, and channel information associated with the channel $H_{21}$ between the base station 2 and the terminal 1.

The terminal 1 may effectively determine whether interference occurs, based on an SINR, a PER, a BER, and the like. Since the terminal 1 does not separately estimate a channel between the base station 2 and the terminal 1, the base station 1 and the base station 2 may have no need to use orthogonal pilots. Also, the base station 2 may simultaneously verify, using a single feedback message, channel information associated with the channel $H_{11}$ between the base station 1 and the terminal 1, and channel information associated with the channel $H_{21}$ between the base station 2 and the terminal 1. Accordingly, it is possible to reduce overhead.

Figure 5:
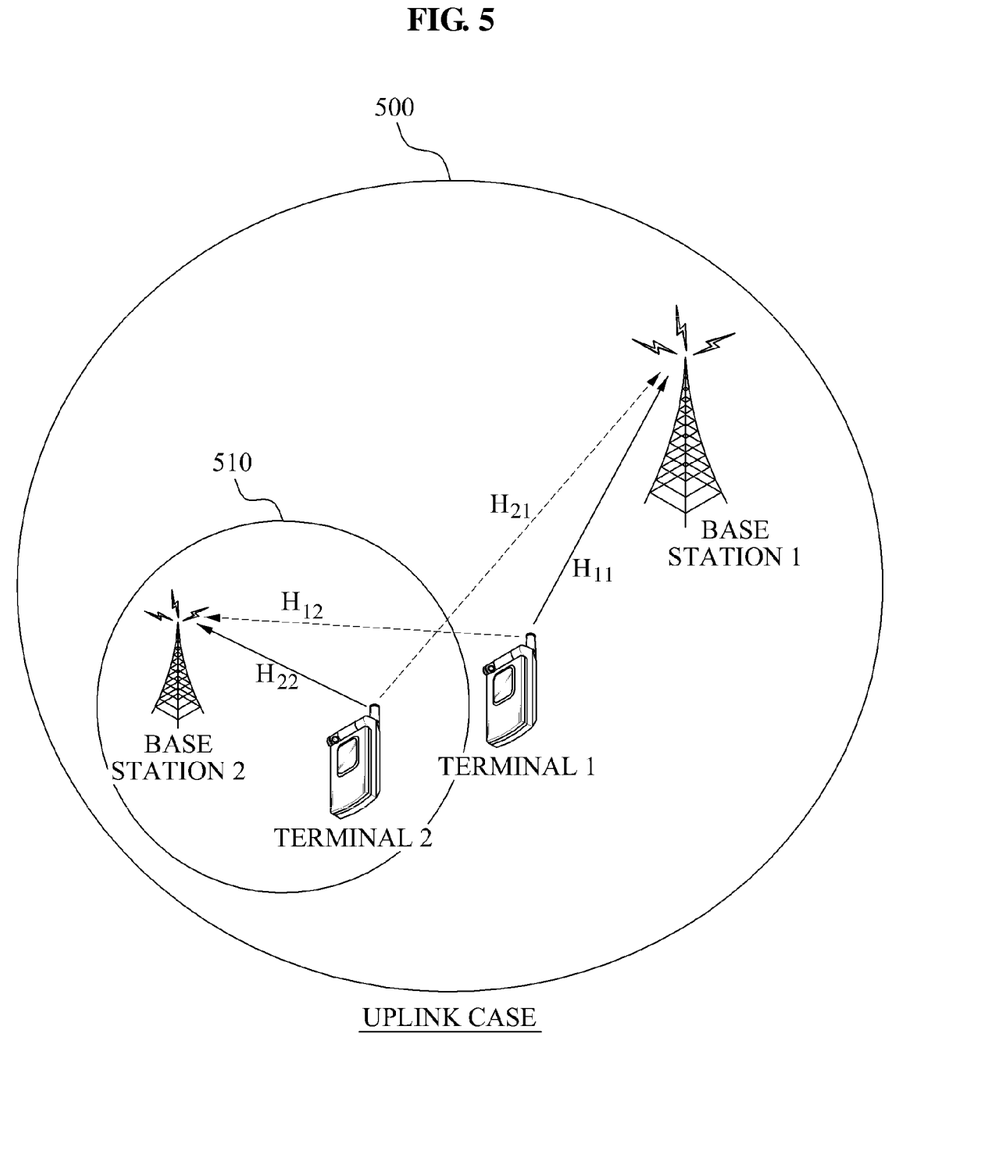
FIG. 5 is a diagram illustrating examples of channels between base stations and terminals in an uplink case.

FIG. 5 illustrates examples of channels between base stations and terminals in an uplink case. Referring to FIG. 5, a coverage 500 of a macro cell includes a coverage 510 of a femtocell.

Referring to FIG. 2, it is assumed that a channel between a terminal 1 and a base station 1 is $H_{11}$, a channel between the terminal 1 and a base station 2 is $H_{12}$, a channel between a terminal 2 and the base station 1 is $H_{21}$, and a channel between the terminal 2 and the base station 2 is $H_{22}$. In association with the base station 2, the channel $H_{22}$ indicates a channel corresponding to a desired signal, and the channel $H_{12}$ indicates an interference channel corresponding to an interference signal.

To outperform adverse effects resulting from interference occurring in the base station 2, the base station 1 may perform an interference control such as a dynamic spectrum management. Accordingly, the base station 2 may need to verify the channels $H_{12}$ and $H_{22}$.

A process where the base station 2 verifies the channels $H_{12}$ and $H_{22}$ will be described in detail with reference to FIG. 6.

Figure 6:
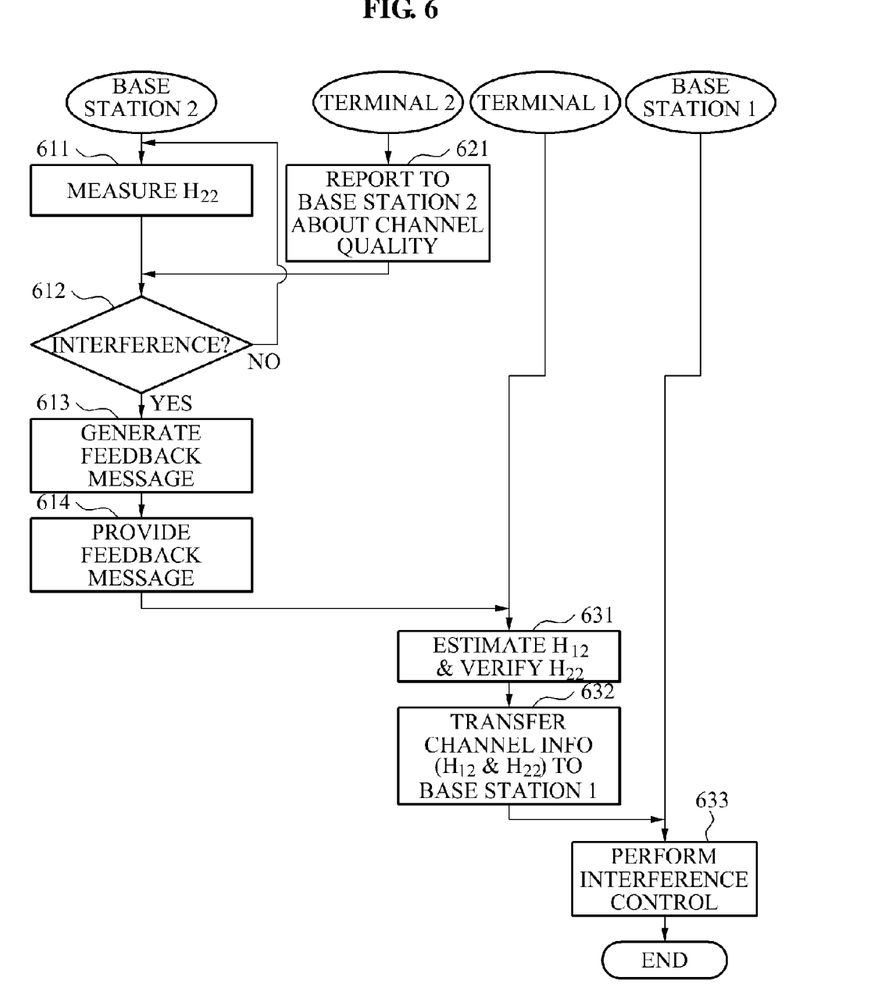
FIG. 6 is a flowchart illustrating an example of a method of operating a terminal 1, a terminal 2, a base station 1, and a base station 2 of FIG. 5.

FIG. 6 illustrates an example of a method of operating the terminal 1, the terminal 2, the base station 1, and the base station 2 of FIG. 5.

At 611, the base station 2 measures the channel $H_{22}$ between the terminal 2 and the base station 2. For example, the base station 2 may measure the channel $H_{22}$ using a sounding packet transmitted from the terminal 2. Measuring the channel $H_{22}$ may include measuring a gain of the channel $H_{22}$ or an SINR of the channel $H_{22}$.

At 621, the terminal 2 reports to the base station 2 about the SINR of the terminal 2 in association with a quality of a using channel. The terminal 2 may report to the base station 2 about the SINR of the terminal 2 using a well-known CQI feedback scheme.

At 612, the base station 2 determines whether interference exists in the base station 2, based on channel information associated with the measured channel $H_{22}$, for example, an SINR. For example, the base station 2 may determine whether the interference exists in the base station 2, based on an SINR of the base station 2, a PER, a BER, and the like.

Where the interference does not exist in the base station 2, the base station 2 may repeat 611 and 612. Conversely, where interference exists, the base station 2 generates a feedback message in at 613. The feedback message may be used by the terminal 1 to verify channel information between the base station 2 and the terminal 2, and channel information between the base station 2 and the terminal 1.

For example, the base station 2 may generate the feedback message by combining channel information associated with the channel $H_{22}$ and a well-known signal such as a pilot signal or a preamble. Similarly, the base station 2 may generate the feedback message by processing channel information associated with channel $H_{22}$ to a reference signal such as a CAZAC sequence. The feedback message may be generated using various types of schemes.

At 614, the base station 2 provides the generated feedback message to the terminal 1 using a common shared channel or a random access channel.

At 631, the terminal 1 verifies channel information associated with the channel $H_{22}$ from the feedback message to estimate channel information associated with the channel $H_{12}$ using the feedback message. For example, the terminal 1 may verify channel information associated with the channel $H_{22}$ from the feedback message, and may also estimate channel information associated with the channel $H_{12}$ using the pilot signal or the preamble included in the feedback message. The terminal 1 may simultaneously estimate channel information associated with the channel $H_{12}$ from the feedback message including the reference signal, and verify channel information associated with the channel $H_{22}$.

At 632, the terminal 1 transfers, to the base station 1, channel information associated with the channel $H_{12}$ and channel information associated with the channel $H_{22}$.

Figure 7:
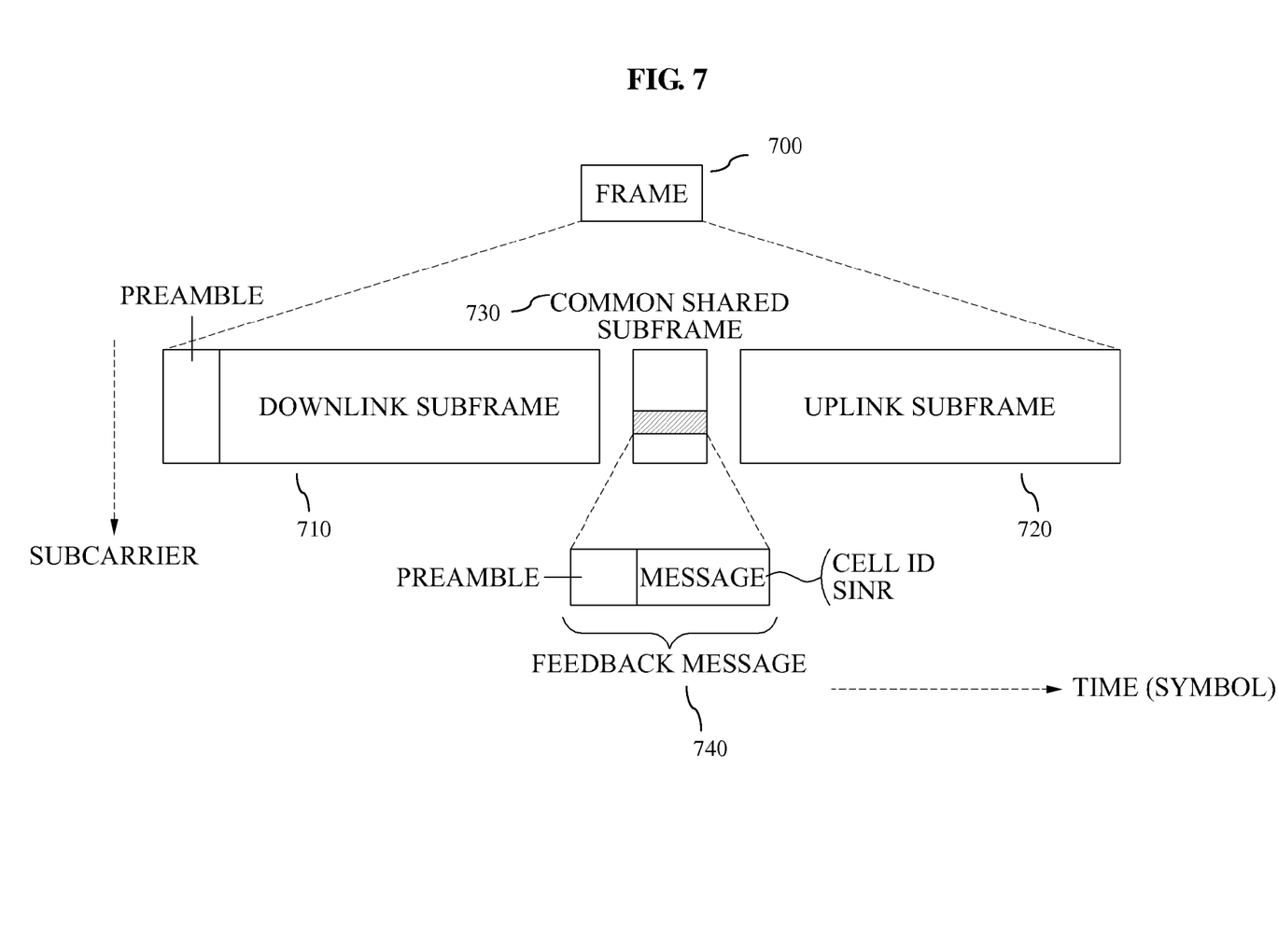
FIG. 7 is a diagram illustrating an example of a frame format.

FIG. 7 illustrates an example of a frame format.

A common shared channel may be used to correspond to a feedback message 740. A common shared subframe 730 indicates a subframe corresponding to the common shared channel.

The entire frame 700 includes a downlink subframe 710, an uplink subframe 720, and the common shared subframe 730. The common shared subframe 730 may be used by a terminal (not illustrated) or a base station (not illustrated) to transmit the feedback message 740.

For example, the terminal or the base station may generate the feedback message 740 by inserting, into a "message" item, an SINR and an ID of a corresponding cell as channel information to be transferred, and by combining a "preamble" as a well-known signal and the "message" item. The terminal or the base station may transmit the feedback message 740 using a portion of or the whole of the common shared subframe 730.

Figure 8:
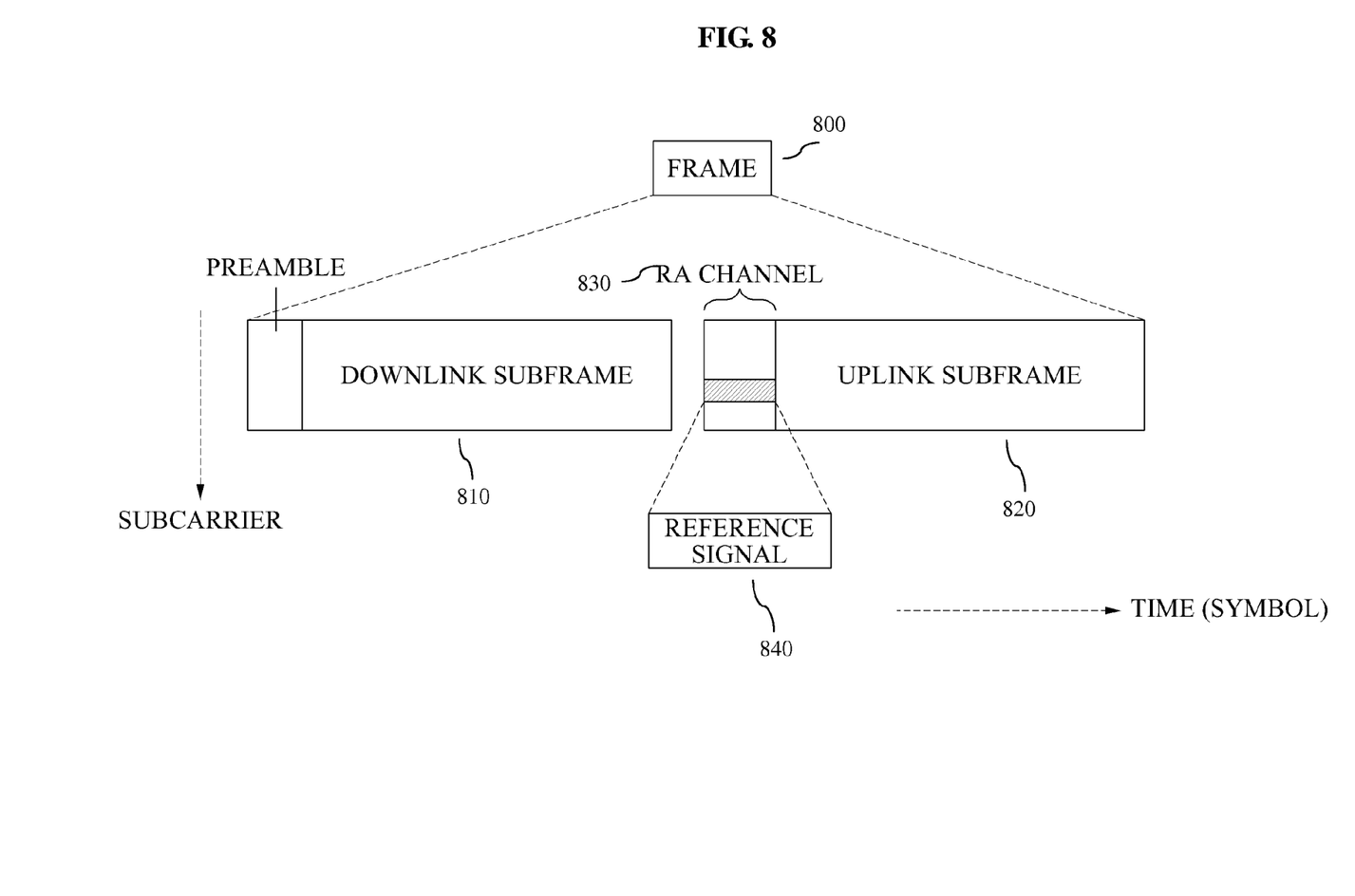
FIG. 8 is a diagram illustrating another example of a frame format.

FIG. 8 illustrates another example of a frame format.

A random access (RA) channel 830 may be used to correspond to a feedback message.

The entire frame 800 includes a downlink subframe 810, an uplink subframe 820, and the random access channel 830. The random access channel 830 may be used by various types of devices. In particular, the random access channel 830 may be used by a terminal (not illustrated) or a base station (not illustrated) to transmit the feedback message.

As described above, it is assumed that the terminal or the base station generates a reference signal 840 such as a CAZAC sequence based on channel information to be transferred, and a cell ID. Accordingly, since the reference signal 840 generated by the terminal or the base station is orthogonal to other reference signals generated by the other devices, the terminal or the base station may validly transfer the channel information without a collision.

A device (not illustrated) receiving the reference signal may extract channel information corresponding to the reference signal, and may estimate, using the reference signal 840, channel information associated with a channel corresponding to a transmission path of the reference signal.

Figure 9:
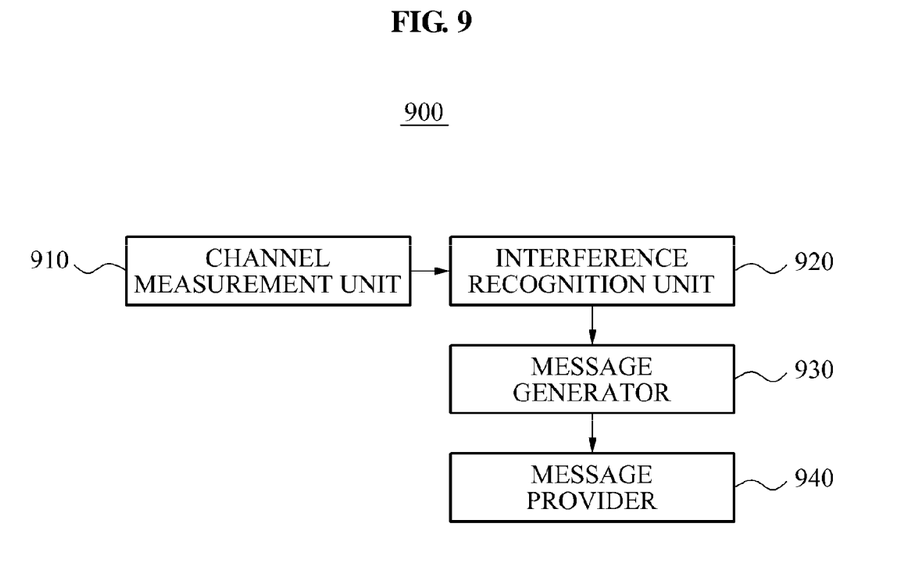
FIG. 9 is a block diagram illustrating an example of a configuration of a terminal.

FIG. 9 illustrates an example of a configuration of a terminal 900.

The terminal 900 being served by a serving base station (not illustrated) includes a channel measurement unit 910, an interference recognition unit 920, a message generator 930, and a message provider 940.

The channel measurement unit 910 may periodically or aperiodically measure channel information between the serving base station and the terminal 900.

The interference recognition unit 920 may recognize interference caused by a neighboring base station (not illustrated). The interference recognition unit 920 may recognize the interference caused by the neighboring base station, based on various factors, for example, an SINR, a PER, a BER, and the like. The interference recognition unit 920 may also recognize the interference caused by the neighboring base station, according to reports from the serving base station about the occurrence of the interference.

The message generator 930 may generate a feedback message that is used by the neighboring base station to verify channel information between the serving base station and the terminal, and channel information between the neighboring base station and the terminal. For example, the message generator 930 may generate the feedback message by combining a well-known signal and channel information between the serving base station and the terminal, or may generate the feedback message by processing channel information between the serving base station and the terminal to a reference signal.

The message provider 940 may provide the feedback message to the neighboring base station. Accordingly, the message provider 940 may provide the feedback message using a common shared channel or a random access channel.

Description made above with reference to FIGS. 1 through 8 are applicable to the terminal 900 and thus a further detailed description will be omitted.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According certain example(s) described above, it is possible to effectively overcome adverse effects resulting from interference occurring between two cells, for example, a macro cell and a femtocell.

According to certain example(s) described above, base stations may obtain information used to more effectively perform an interference control using a unique feedback message.

According to certain example(s) described above, different cells may smoothly share channel information using a common shared channel or a random access channel.

According to certain example(s) described above, it is possible to more effectively recognize interference based on a packet error rate, a bit error rate, an SINR, and the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating a target terminal, the method comprising:

recognizing an interference caused by a neighboring base station based on a result of a comparison between a particular level and channel information between a serving base station and the target terminal, the target terminal being serviced by the serving base station;

generating a feedback message comprising the channel information between the serving base station and the target terminal, the channel information being mapped to a predetermined orthogonal reference signal, in response to the recognized interference; and providing the feedback message to the neighboring base station, the neighboring base station simultaneously verifying a pattern of the predetermined orthogonal reference signal to verify the channel information between the serving base station and the target terminal, and estimating channel information between the neighboring base station and the target terminal, based on the feedback message.

2. The method of claim 1, wherein the providing of the feedback message comprises:

providing the feedback message to the neighboring base station using a common shared channel or a random access channel.

3. The method of claim 1, wherein the generating of the feedback message comprises:

combining a well-known signal and the channel information between the serving base station and the target terminal to generate the feedback message.

4. The method of claim 1, further comprising:

periodically or aperiodically generating the channel information between the serving base station and the target terminal.

5. The method of claim 1, wherein the recognizing of the interference comprises:

recognizing the interference caused by the neighboring base station based on a signal-to-interference plus noise ratio (SINR) with respect to a signal received from the serving base station, or a packet error rate, or a bit error rate, or any combination thereof.

6. The method of claim 1, wherein:

the serving base station, the target terminal, and the neighboring base station operate based on a time division duplex (TDD) scheme; and the channel information between the neighboring base station and the target terminal is regarded as the same in each of an uplink and a downlink.

7. The method of claim 1, wherein the neighboring base station performs an interference control based on the feedback message.

8. A non-transitory computer-readable storage medium storing a program to operate a target terminal, comprising instructions to cause a computer to:

recognize an interference caused by a neighboring base station based on a result of a comparison between a particular level and channel information between a serving base station and the target terminal, the target terminal being serviced by the serving base station;

generate a feedback message comprising the channel information between the serving base station and the target terminal, the channel information being mapped to a predetermined orthogonal reference signal, in response to the recognized interference; and provide the feedback message to the neighboring base station, the neighboring base station simultaneously verifying a pattern of the predetermined orthogonal reference signal to verify the channel information between the serving base station and the target terminal, and estimating channel information between the neighboring base station and the target terminal, based on the feedback message.

9. A target terminal comprising:

a channel measurement unit configured to periodically or aperiodically generate channel information between a serving base station and the target terminal, the target terminal being serviced by the serving base station;

an interference recognition unit configured to recognize an interference caused by a neighboring base station based on a result of a comparison between a particular level and the channel information between the serving base station and the target terminal;

a message generator configured to generate a feedback message comprising the channel information between the serving base station and the target terminal, the channel information being mapped to a predetermined orthogonal reference signal, in response to the recognized interference; and a message provider configured to provide the feedback message to the neighboring base station, the neighboring base station simultaneously verifying a pattern of the predetermined orthogonal reference signal to verify the channel information between the serving base station and the target terminal, and estimating channel information between the neighboring base station and the target terminal, based on the feedback message.

10. The target terminal of claim 9, wherein:

the message generator is further configured to combine a well-known signal and the channel information between the serving base station and the target terminal; and the message provider is further configured to provide the feedback message to the neighboring base station using a common shared channel or a random access channel.

11. The method of claim 2, wherein the common shared channel or the random access channel is between a downlink subframe and an uplink subframe of the serving base station, the target terminal, and the neighboring base station.

12. The method of claim 1, wherein the recognizing of the interference comprises:

recognizing the interference caused by the neighboring base station based on a packet error rate and a bit error rate.

* * * * *